US007260397B2

(12) United States Patent
Virtanen et al.

(10) Patent No.: US 7,260,397 B2
(45) Date of Patent: Aug. 21, 2007

(54) RECONFIGURATION OF A MOBILE TELECOMMUNICATIONS NETWORK ELEMENT

(75) Inventors: Marko Virtanen, Tampere (FI); Risto Leppala, Tampere (FI)

(73) Assignee: Nokia Corporation, Espoo (FI)

( * ) Notice: Subject to any disclaimer, the term of this patent is extended or adjusted under 35 U.S.C. 154(b) by 286 days.

(21) Appl. No.: 10/329,361

(22) Filed: Dec. 27, 2002

(65) Prior Publication Data

US 2004/0203810 A1 Oct. 14, 2004

(51) Int. Cl.
*H04Q 7/20* (2006.01)
(52) U.S. Cl. .................. 455/435.3; 455/436; 455/434; 455/433; 455/515; 455/524; 370/331
(58) Field of Classification Search ........ 455/443–449, 455/450, 452.1, 451, 422.1, 424, 426.1, 426.2, 455/524–525, 502–503, 436–440, 433–434, 455/515, 517; 370/331–337
See application file for complete search history.

(56) References Cited

U.S. PATENT DOCUMENTS 5,291,488 A * 3/1994 Jestice et al. ............... 370/254
5,371,492 A * 12/1994 Lohrbach et al. ........... 455/508
5,434,798 A * 7/1995 Madebrink et al. ......... 709/221

(Continued)

FOREIGN PATENT DOCUMENTS

CN        1297658        5/2001

(Continued)

OTHER PUBLICATIONS

"3rd Generation Partnership Project; Technical Specification Group Services and System Aspects; 3G Configuration Management (CM); Concept and high-level requirements (Release 5)," XP-002273253, 3GPP TS 32.600 V5.0.0, Sep. 2002, pp. 1-20.

*Primary Examiner*—George Eng
*Assistant Examiner*—Kamran Afshar
(74) *Attorney, Agent, or Firm*—Squire, Sanders & Dempsey L.L.P.

(57) ABSTRACT

The present invention discloses a method and a system for reconfiguring a mobile telecommunications network. In the method network elements to be reconfigured are arranged into groups according to a grouping parameter. A priority value is assigned to the groups. The network elements are reconfigured by groups in an order indicated by the assigned priority value. For example cells in the mobile telecommunications network are reconfigured in an order indicated by the priority value so that the entire network is not updated concurrently. Typically the priority values are assigned so that adjacent cells do not share the same priority value thus existing connections can be handed over to adjacent cells so that the services do not have any breaks.

15 Claims, 3 Drawing Sheets

U.S. PATENT DOCUMENTS

| | | | |
|---|---|---|---|
| 6,094,581 A * | 7/2000 | Fried et al. | 455/449 |
| 6,181,940 B1 * | 1/2001 | Rune | 455/435.2 |
| 6,295,451 B1 * | 9/2001 | Mimura | 455/436 |
| 6,477,158 B1 * | 11/2002 | Take | 370/335 |
| 6,600,924 B1 * | 7/2003 | Sinivaara et al. | 455/444 |
| 6,728,203 B2 * | 4/2004 | Wang | 370/210 |
| 6,751,444 B1 * | 6/2004 | Meiyappan | 455/69 |
| 6,813,260 B1 * | 11/2004 | Fogle | 370/338 |
| 6,819,940 B1 * | 11/2004 | Kosaki | 455/552.1 |
| 6,859,440 B1 * | 2/2005 | Sonti et al. | 455/422.1 |
| 7,139,284 B1 * | 11/2006 | Furukawa et al. | 370/441 |
| 2002/0027891 A1 * | 3/2002 | Mimura | 455/436 |
| 2003/0040311 A1 * | 2/2003 | Choi | 455/434 |
| 2004/0043774 A1 * | 3/2004 | Lee | 455/456.1 |
| 2004/0209633 A1 * | 10/2004 | Briancon et al. | 455/513 |

FOREIGN PATENT DOCUMENTS

| | | |
|---|---|---|
| WO | WO91/14278 | 9/1991 |
| WO | WO99/55106 | 10/1999 |
| WO | WO 00/75788 1 | 12/2000 |
| WO | WO 02/33995 A2 | 4/2002 |

* cited by examiner

RECONFIGURATION OF A MOBILE TELECOMMUNICATIONS NETWORK ELEMENT

FIELD OF THE INVENTION

The present invention relates to mobile telecommunications network reconfiguration. Specifically the present invention concerns updating a mobile telecommunications network element configuration.

BACKGROUND OF THE INVENTION

Network elements like base stations of mobile telecommunications networks are comparable to computers in terms of reconfiguration process. The reconfiguration process may comprise any type of hardware and software configuration changes. The reconfiguration process in mobile telecommunications networks typically includes software updates or updating radio network parameters such as radio frequencies or e.g. signal transmitting power. The reconfiguration may cause interference in the network, e.g. because of software incompatibilities or temporarily overlapping parameter values. Thus it is disturbing services offered in the network. The reconfiguration process may require a restart of the whole radio network, e.g. when a new radio frequency plan is activated in the network. Restarting base stations or any other network elements usually results in service breaks. Thus restarts should be scheduled to be executed at a time of low network load, e.g. at nighttime. The increased utilization of packet switched mobile services has however increased network load during nighttime also. This results in service breaks for even more subscribers.

A mobile telecommunications system, such as a GSM (Global System for Mobile communication) or a 3GPP ($3^{rd}$ Generation Partnership Project) system, comprises a cellular radio network. A cell refers to an area in which one base station is operable. Bounds of a cell are not constant because of e.g. changes in weather conditions. Base stations next to each other need to operate on different radio frequencies so that their cells will not interfere with each other because of overlapping. FIG. 1 illustrates cells overlapping each other. The overlapping in FIG. 1 is an example, thus the cells may overlap more or less depending on e.g. weather conditions and/or network design. The network uses four different radio frequencies in the example in FIG. 1. The frequencies are designated numbers 1-4. The cells are organized in such a manner that the same frequencies do not overlap each other.

In prior art a reconfiguration, such as e.g. a radio frequency change, has been applied simultaneously to several base stations in a cellular communication network such as a GSM network. Typically base stations are configured one base station controller at a time. That is, base stations controlled by a base station controller are reconfigured in a bunch. All the existing connections in the involved cells must be disconnected or handed over manually cell by cell for reset. New connections are not allowed while reset is being applied. These cause service breakdowns which disturb subscribers using the network during the reconfiguration.

The more base station controllers and base stations there exist in a network and the more base stations are configured at a time, the more complicated the procedure becomes. Thus a vast group of base stations requires an efficient system for reconfiguration.

Mobile telecommunications, GSM for example, has become more and more popular and the amount of mobile users has grown rapidly in the networks. Mobile operators must guarantee a quality of service both to their existing and new subscribers. That is why they must increase the capacity of their network. For example, a base station can serve only a limited amount of users at a time, thus new base stations need to be built for the network. New base stations may cause changes e.g. to the neighboring cells because the neighboring base stations need to use different radio frequencies. The changes in the neighboring cells may cause further changes to their respective neighbors and so on. Because of this the reconfiguration is a complex process. The more network elements like base stations have to be reconfigured in a given time, the more complex the system gets.

3GPP radio networks operate in higher frequencies than GSM networks. Therefore 3GPP networks require more base stations to cover the same geographical area. Base stations are reconfigured individually in 3GPP systems. This eliminates some of the drawbacks of the GSM network reconfiguration since the changes affect locally. However, the more base stations are reconfigured individually, the more time is needed for the reconfiguration. Changes to a whole network, e.g. software updates, typically require a service breakdown or a slow reconfiguration base station by base station.

The prior art methods for reconfiguration are complex and inefficient. A further drawback is a service breakdown, in some cases for the whole network. These cause unnecessary expenses to operators and extraneous disturbances for subscribers using the service while the network is being reconfigured. Thus there is an obvious need for an efficient method for reconfiguring mobile telecommunications networks.

SUMMARY OF THE INVENTION

The present invention discloses a method and a system for mobile telecommunications network element reconfiguration. A mobile telecommunications network comprises a cellular radio network, a transmission network and a core network. According to the invention network elements are arranged into groups and each group is assigned a unique priority value according to a given grouping parameter, thus several network elements share same priority value. The priority values may be assigned manually or automatically. If necessary, more than one priority value may be assigned. Typically the priority value is set automatically. Priority values are assigned in such a manner that neighboring network elements, e.g. adjacent cells have different values from each other. In this document an adjacent cell refers to a neighboring cell which either overlaps to a present cell or is tangential to the present cell. Typically the grouping parameter of network elements is based on frequency or scrambling code of the cells. E.g. in case of a WCMDA (Wideband Code Division Multiple Access) network the priority value is typically based on the scrambling code of the cell. When a priority value is assigned to a GSM cell and the value is based on the frequency, the neighboring cells will have automatically different priority value because they do not operate in the same frequency.

Network elements are reconfigured based on the priority value in reconfiguration process. When the necessary updates are done, the changes are activated for example by restarting the network elements according to the priority value. When a network element is to be updated, the network element is first disabled from accepting new connections. The existing connections are moved to the neighboring network elements if possible. If the connection is established from such a location that moving is not possible, the connection needs to be discarded. When all the connections have been moved, the network element will be updated after which new connections will be accepted. A similar procedure is applied to all the groups.

The present invention discloses an efficient way of reconfiguring mobile telecommunications networks. The invention is easy to implement to existing networks and therefore beneficial especially in large networks with multiple users round the clock. The invention allows for most of the users to continue using services without any breaks during the reconfiguration. In most cases the subscriber will not even notice the reconfiguration process. Further, even in cases where the reconfiguration process does not result in restarting a network element, the present invention is still beneficial in that the instability of the network will pass quickly.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE INVENTION

Reference will now be made in detail to the embodiments of the present invention, examples of which are illustrated in the accompanying drawings.

Figure 1:
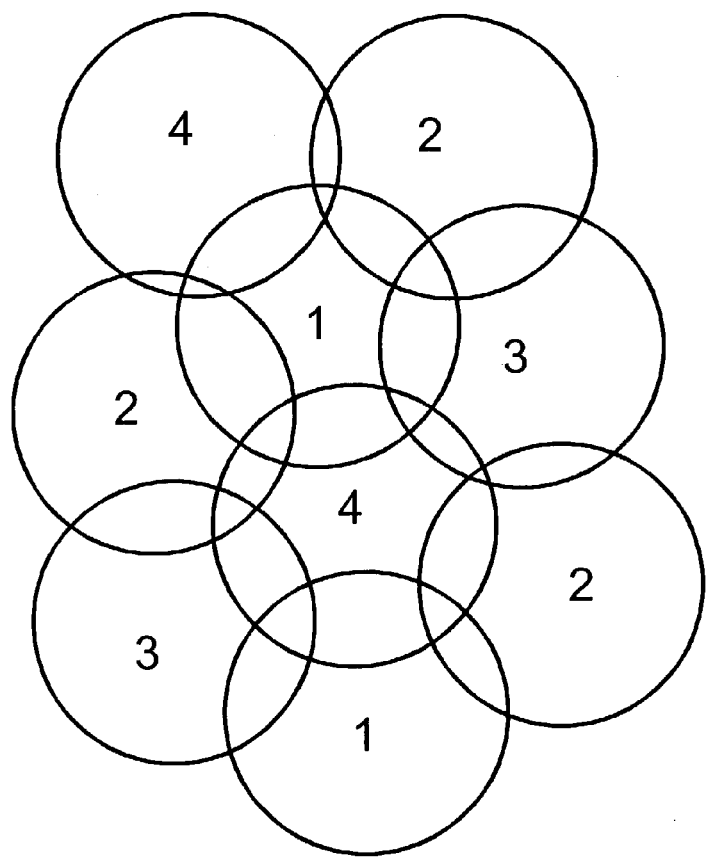
FIG. 1 discloses a general prior art cellular radio network structure.
Figure 2:
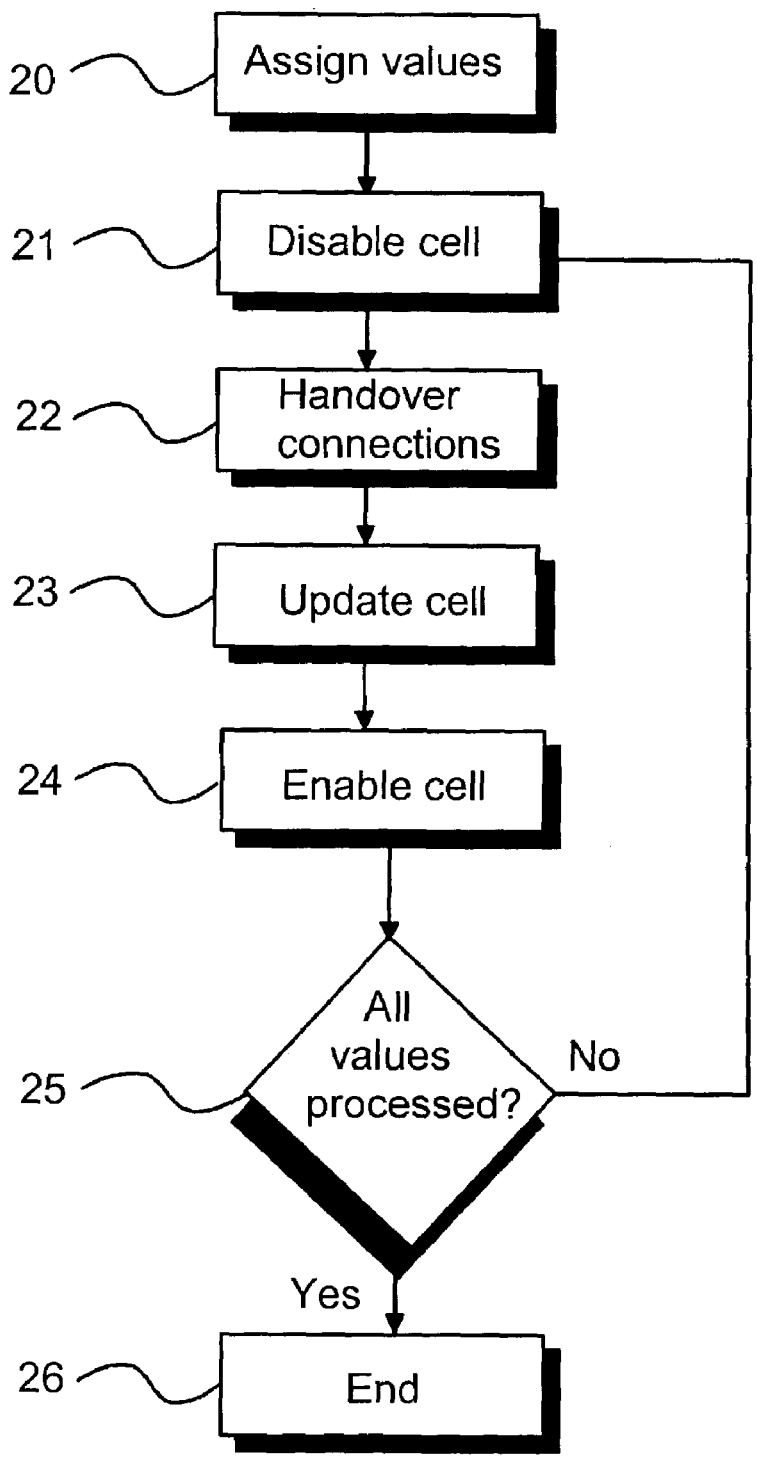
FIG. 2 is a flow chart of the method according to one embodiment of the present invention.

FIG. 2 illustrates a method for reconfiguring a mobile telecommunications network element. In a preferred embodiment the network is a mobile telecommunications network such as a GSM or 3GPP and the network element is a radio network cell. The method disclosed in FIG. 2 consists of assigning priority values and four iterative steps for updating a network element configuration. In the beginning a priority value is assigned to cells to be reconfigured, step 20. The priority values are assigned by grouping given cells and allocating a unique priority value to each group. The priority value may be reassigned every time an update is needed. The priority value may be selected also manually, but typically it is set automatically. If necessary, more than one priority value may be assigned. The priority value corresponds to network element parameter(s) e.g. to frequency and/or scrambling code of the cell so that the priority values of the adjacent cells have different values from each other. By doing this a radio network can be updated without discarding existing connections. This is the most beneficial way of assigning priority values e.g. for the radio network update even though the priority values may also be selected separately. The priority value can also be based for example on the geographical location of the network element. It should be noted that priority values could be assigned also partially so that the whole network is not updated.

After the priority values have been set, the reconfiguration procedure may begin. Steps of the reconfiguration are performed sequentially according to the priority value. In the beginning the cells with the highest priority value are disabled, step 21. Disabling ensures that no new connections are established to the cell.

After disabling the cells existing connections have to be rerouted to non-disabled cells, e.g. handed over to adjacent cells, step 22. If there is e.g. no coverage for adjacent cells or if adjacent cells do not have enough capacity for all connections to be handed over, some connections may have to be disconnected. When there are no active connections left in the cells with the highest priority value, their configuration may be updated, step 23. Cells are restarted after the updating if the activation of the updating requires that. The cell may be enabled for new connections, step 24, after the configuration updating and the possible restart. When the cell is enabled, it is ready to operate as usual. After processing one priority value the reconfiguration system will check if all the selected priority values are processed. If they are, the process is over, step 26. Otherwise the steps 21-25 are applied to the next priority value.

Figure 3:
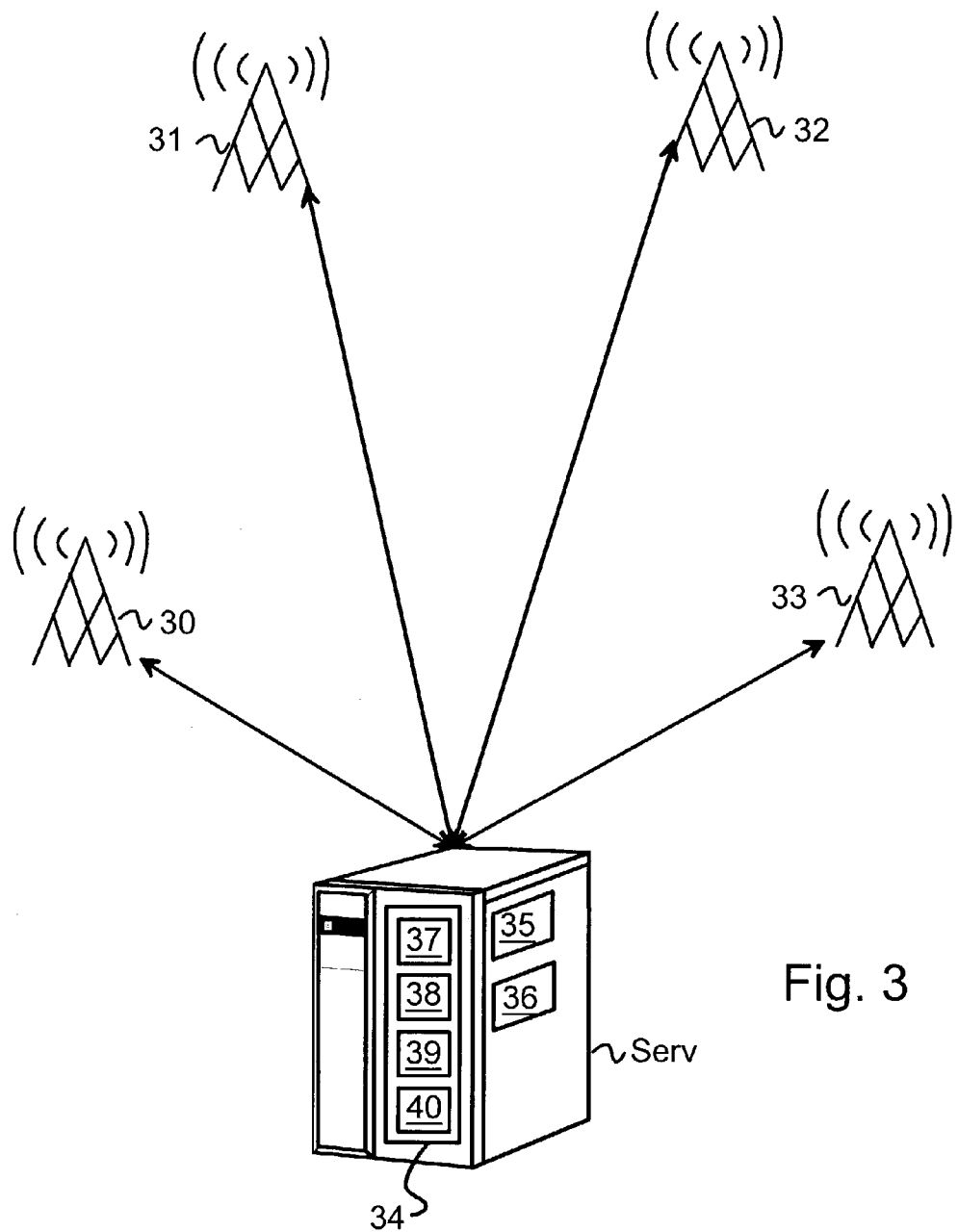
FIG. 3 is a diagram illustrating a system according to one embodiment of the present invention.

FIG. 3 illustrates a system for reconfiguring a mobile telecommunications network elements. The system comprises a radio access network comprising base stations 30-33 and terminal devices (not disclosed in FIG. 3) which are connected to base stations. The radio network comprises a reconfigurer 34, an arranger 35 for arranging cells into logical groups according to a given grouping parameter(s) and an assigner 36 for assigning a priority value to the network elements in the group. The reconfigurer 34 further comprises a disabler 37 for disabling the network elements from accepting further connections and moving means 38 for moving the existing connections to non-disabled, e.g. adjacent network elements. The reconfigurer 34 further comprises an updating means 39 for updating the network elements by groups and an enabler 40 for enabling the network elements for new connections. Said reconfigurer, arranger, assigner, disabler, moving means, updating means, and enabler may be implemented in software and/or hardware.

In yet another embodiment of the invention a telecommunication transmission network element is reconfigured. The method according to the present invention can be applied to any reconfiguration of a communications network element in which moving the connections to the other network element is possible.

It is obvious to a person skilled in the art that with the advancement of technology, the basic idea of the invention may be implemented in various ways. The invention and its embodiments are thus not limited to the examples described above, instead they may vary within the scope of the claims.

The invention claimed is:

1. A method, comprising:
    arranging network elements of a mobile telecommunications network into groups according to a given grouping parameter, wherein each network element is a mobile telecommunications radio network cell;
    assigning a unique priority value to each group; and
    reconfiguring the network elements by groups in an order indicated by the assigned priority values, wherein the reconfiguring the network elements by groups further comprises
    disabling the network elements in a group from accepting further connections; moving existing connections of the disabled network elements in said group to non-disabled network elements,
    updating configurations of the disabled network elements in said group, and enabling the disabled network elements in said group for connections.

2. A system, comprising:
an arranger configured to arrange selected network elements of a mobile telecommunication network into groups according to a given grouping parameter, wherein each network element is a mobile telecommunications radio network cell;
an assigner configured to assign a unique priority value to each group; and
a reconfigurer configured to reconfigure the network elements by groups in an order indicated by the assigned priority values, wherein the reconfigurer comprises
a disabler configured to disable the network elements in a group from accepting further connections,
a moving unit configured to move existing connections of the disabled network elements in said group to non-disabled network elements,
an updating unit configured to update configurations of the disabled network elements in said group, and
an enabler configured to enable the disabled network elements in said group for new connections.

3. The system according to claim 2, wherein the updating unit is configured to activate the updated configurations by restarting the disabled network elements.

4. The system according to claim 2, wherein the moving unit is further configured to discard the existing connections if moving said connections is not possible.

5. The system according to claim 2, wherein the assigner is configured to assign the priority value based on radio frequencies of the mobile telecommunications radio network cells.

6. The system according to claim 2, wherein the assigner is configured to assign the priority value based on scrambling codes of the mobile telecommunications radio network cells.

7. The system according to claim 2, wherein the assigner is configured to assign the priority value based on the geographical locations of the network elements.

8. The system according to claim 2, where each group consists of non-neighboring network elements.

9. An apparatus, comprising:
arranging means for arranging selected network elements into groups according to a given grouping parameter, wherein each network element is a mobile telecommunications radio network cell;
assigning means for assigning a unique priority value to each group; and
reconfiguration means for reconfiguring the network elements by groups in an order indicated by the assigned priority values, wherein reconfiguration means comprise
disabling means for disabling the network elements in a group from accepting further connections,
moving means for moving existing connections of the disabled network elements in said group to non-disabled network elements,
updating means for updating configurations of the disabled network elements in said group, and
enabling means for enabling the disabled network elements in said group for new connections.

10. A computer program embodied on a computer readable medium, said computer program for reconfiguring a mobile telecommunications network comprising multiple network elements, wherein the computer program performs the following steps when executed in a data processing device:
arranging network elements into groups according to a given grouping parameter, wherein each network element is a mobile telecommunications radio network cell;
assigning a unique priority value to each group; and
reconfiguring the network elements by groups in an order indicated by the assigned priority values, wherein the reconfiguring further comprises
disabling the network elements in a group from accepting further connections,
moving existing connections of the disabled network elements in said group to non-disabled network elements,
updating configurations of the disabled network elements in said group, and
enabling the disabled network elements in said group for new connections.

11. A reconfigurer, comprising:
a reconfiguring unit configured to reconfigured network elements of a mobile telecommunications network by groups in an order indicated by an assigned priority value, and wherein each network element is a mobile telecommunications radio network cell;
a disabler configured to disable the network elements in a group from accepting further connections;
a moving unit configured to move existing connections of the disabled network elements in said group to non-disabled network elements;
an updating unit configured to update configurations of the disabled network elements in said group; and
an enabler configured to enable the disabled network elements in said group for new connections.

12. A reconfigurer comprising:
reconfiguring means for reconfiguring network elements, of a mobile telecommunications network, by groups in an order indicated by an assigned priority value, and wherein each network element is a mobile telecommunications radio network cell;
a disabling means for disabling the network elements in a group from accepting further connections;
moving means for moving existing connections of the disabled network elements in said group to non-disabled network elements;
updating means for updating configurations of the disabled network elements in said group; and
an enabling means for enabling the disabled network elements in said group for new connections.

13. A method, comprising:
reconfiguring the network elements of a mobile telecommunications network by groups in an order indicated by an assigned priority value, and wherein each network element is a mobile telecommunications radio network cell, wherein the reconfiguration further comprises
disabling the network elements in a group from accepting further connections,
moving existing connections of the disabled network elements in said group to non-disabled network elements,
updating configurations of the disabled network elements in said group, and
enabling the disabled network elements in said group for new connections.

14. A computer program embodied on a computer readable medium, said computer program for reconfiguring a mobile telecommunications network comprising multiple network elements, wherein the computer program performs when executed in a data-processing device:

reconfiguring the network elements by groups in an order indicated by an assigned priority values, wherein each network element is a mobile telecommunications radio network cell, wherein the reconfiguring the network elements by groups further comprises disabling the network elements in a group from accepting further connections; moving existing connections of the disabled network elements in said group to non disabled network elements, updating configurations of the disabled network elements in said group, and enabling the disabled network elements in said group for connections.

15. An apparatus comprising:

an arranger configured to arrange selected network elements of a mobile telecommunication network into groups according to a given grouping parameter, wherein each network element is a mobile telecommunications radio network cell;

an assigner configured to assign a unique priority value to each group; and a reconfigurer configured to reconfigure the network elements by groups in an order indicated by the assigned priority values, wherein the reconfigurer comprises a disabler configured to disable the network elements in a group from accepting further connections, a moving unit configured to move existing connections of the disabled network elements in said group to non-disabled network elements, an updating unit configured to update configurations of the disabled network elements in said group, and an enabler configured to enable the disabled network elements in said group for new connections.

* * * * *